WRIGHT & BUTLER.

Lamp Burner.

No. 101,073.                    Patented March 22, 1870.

Witnesses
Chas. H. Cadeway
Wm. T. Hutchinson

Inventors
David P. Wright
Cephas Butler
By David A. Burr
Atty.

N. PETERS, PHOTO-LITHOGRAPHER, WASHINGTON, D. C.

WRIGHT & BUTLER.
Lamp Burner.

No. 101,073. Patented March 22, 1870.

Witnesses
Chas. Hadaway
Wm. T. Hutchinson

Inventors
David P. Wright
Cephas Butler
By David A. Burr
Atty.

United States Patent Office.

DAVID PITCAIRN WRIGHT AND CEPHAS BUTLER, OF BIRMINGHAM, ENGLAND.

Letters Patent No. 101,073, dated March 22, 1870.

---

IMPROVEMENT IN LAMP-BURNERS.

---

The Schedule referred to in these Letters Patent and making part of the same.

---

We, DAVID PITCAIRN WRIGHT and CEPHAS BUTLER, of Birmingham, in the county of Warwick, England, lamp manufacturers, have invented certain "Improvements for Burning Paraffine and other Hydrocarbon-Oils," of which the following is a specification.

Our invention relates to an improvement obtained in the construction of the base of the burner of a lamp for burning hydrocarbon-oils, by piercing the upper part thereof with a row of perforations just beneath the offset or gallery supporting the glass shade of the lamp, the object of our invention being to provide for an automatic regulation of the supply of oxygen to the flame, and thus obtain more perfect combustion and uniform brilliancy of light under all ordinary conditions.

We give effect to our improvement by using a thin sheet-metal base, formed into a bell-mouth or spreading shape, by preference serrated, perforated, or vandyked on its lower edge for air-way; and into this we fit a perforated convexed disk, to which disk a concentric tube is secured or formed, for receiving the rectangular cotton-holder and regulator, the lower end of the tube before mentioned being screwed or otherwise in the ordinary way for screwing into the oil-vessel.

The spreading or bell-mouth base contracts, and terminates upward with a perforated concentric disk, formed of the same, or applied within the top edge of the flange and shoulder, below which are pierced the perforations which constitute our improvement.

Around the flange is placed a bezel or gallery, for supporting a glass shade, having a concentric row of perforations, so as to admit the air through the bezel or gallery to the interior of the said glass globe or shade, which shade supports and protects the flame of the lamp from draughts and external currents of air; and over this flange, above referred to, the dome that covers the top or burning portion of the wick is placed, which dome is slightly contracted, terminating upward in a regular curve, and through which the ordinary oblong aperture is cut for the gaseous flame to pass through, the base of which dome, by preference, is indented or raised vertically on one side, to correspond with an indentation or raised part in the top flange of the base, to insure the dome being so placed that the opening shall be parallel with the wick and wick-tube below.

In action, or when burning, a strong current of air is drawn in under the bell-mouth, which air is broken up and evenly distributed before ascending to support the flame by passing through the two or more perforated disks placed above. All excess of air beyond what combustion requires according to the regulation of the wick escapes through the perforations surrounding the upper part of the base just beneath the gallery, so that the lamp regulates its own supply of oxygen, which oxygen, by the regular form of the dome or cap before referred to, contributes much to the regular support of the gaseous flame emitted from the cotton wick.

Description of the Accompanying Drawings.

Figure 1 is a side view of what we have before termed the bell-mouth base, (but which of itself is not new,) provided with the vandyked lower edge $a\ a$, or its equivalent, for admitting the air to the interior of the burner. The top part concentric with the flange or part marked $b\ b$ may be entirely removed, or be finely perforated and allowed to remain, either struck up into a dome-shape, as here shown, or left flat and horizontal. The row of holes, $c\ c$, perforated about its upper part constitutes the important element of our invention in producing the result we attain. On the flange $b$, at right angles, by preference, with the wick-holder, not shown in this figure, an indentation is formed, for the purpose of receiving a corresponding indent on the dome or cap E, as seen in position in relation with the base last described at Figure 2, which is a sectional view of the burner complete, the indentation of the dome before referred to being marked $d$, and with the same letter is an inverted view of the dome or cap E at Figure 3. By these simple indentations, the dome or cap will have its defined position that the hole through which the flame passes shall always be in true position with the wick and wick-holder below.

In fig. 2, we have represented, at $f\ f$, a perforated disk applied within the top or contracted part of the bell-mouth base, and to which the wick-holder is united by soldering or otherwise; but, as before stated, instead of applying a perforated disk, the same may be formed of the top part of the bell-mouth base G G; and at the lower or spreading part of this base we unite, by soldering or otherwise, another perforated disk, so raised and formed that a concentric shank is formed and screwed, as at $h\ h$, for uniting the whole burner to the oil-vessel or reservoir.

The perforated disk $k\ k$ has a cap, marked $u$, for carrying and supporting the cotton-regulator, marked $m$, the axis of which is shown in section, and it may also subserve to hold and sustain, by soldering or otherwise, the wick-tubes. We say tubes, because we purpose in a general way, as here shown, using an additional wick, not for burning, but for the advantages of its medium of absorption and capillary attraction, so as to assist in supplying the wick proper with the oil for supporting combustion, and which auxiliary tube and wick we have exhibited passing up vertically, in connection with the wick-holder proper, through the screwed shank $h\ h$, cap $l$, and perforated disk $f$, the said auxiliary tube and cotton being marked $n\ n$, while the cotton proper, shown in dotted lines, is marked $o\ o$.

The dome or cap E we design to be of the shape here shown, viz: a regular curve, as we find its uniformity assists in concentrating the current of air on each side of the wick, thereby assisting and continuing to impinge the flame at the point of combustion, so as to conduce to the perfect combustion of the oil, as the flame escapes beyond the surface of the said dome or cap.

Around the bottom of the dome, and just over the row of perforations here shown marked $c\ c$, a gallery is applied, marked $p$, for supporting a glass shade, which may be retained by a projecting lip, marked $q$, and set-screw $r$, or by any other convenient means.

This gallery has a row of perforations, as indicated by the arrows, for the free admission and circulation of air within the said glass shade; and, if desired, the said gallery may be formed, with the dome, of one piece of metal.

Figure 4:
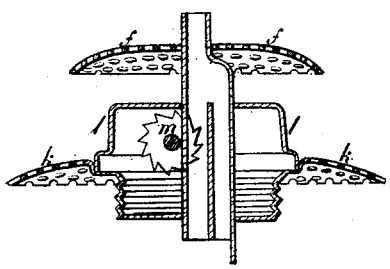
Figure 4 is simply a detached sectional view of the internal parts, as shown also in section at fig. 2.
Figure 1:
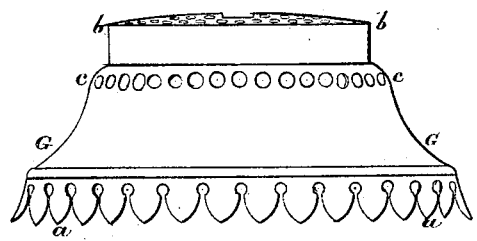
Figure 2:
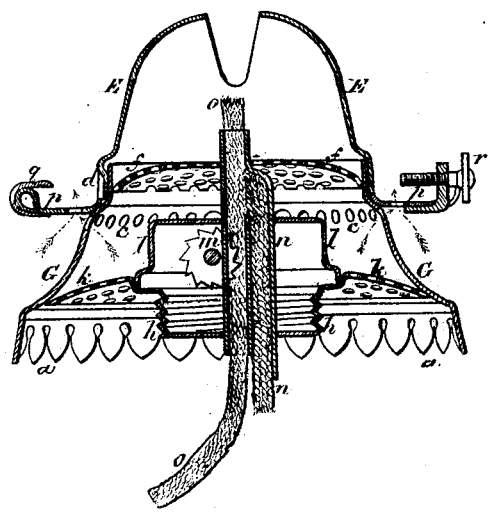
Figure 6:
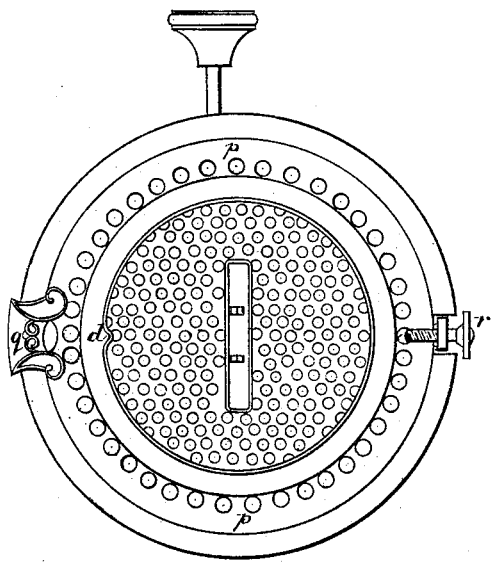
Figure 6 is the same, with the dome or cap E removed, showing the indentation $d$, before referred to, for the corresponding indent in the dome, shown by the same letter at fig. 3, to fit into.
Figure 5:
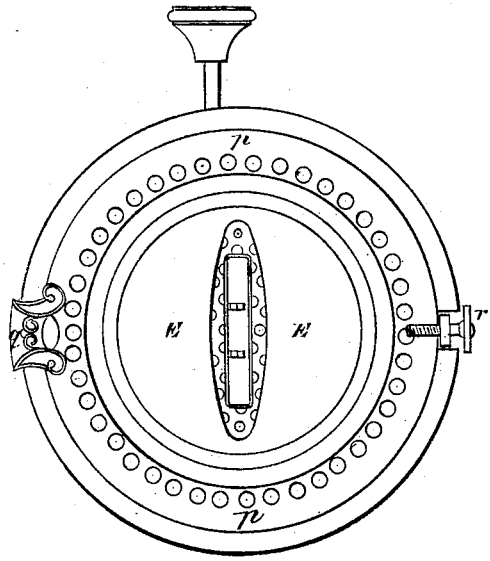
Figure 5 is a top view of fig. 2.
Figure 3:
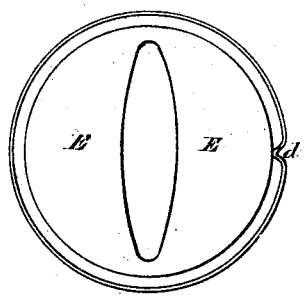

Having thus given in detail a description of our invention, and the manner in which the same may be carried into effect by ordinary work-people accustomed to the manufacture of lamps, or the raising, shaping, piercing, or perforating of thin sheet metal, we wish it observed that we do not bind ourselves to the exact shape, proportion, or details here exhibited, as the same may be generally varied in the style of work and detail of fabrication without departing from the spirit of our invention; as, for instance, the lower serrated edge of the base part G may be pierced in any variety of pattern, or so placed as to be capable of admitting air through or underneath it, and its general curvature may be altered, and stamped or raised into any desirable design; and, in like manner, the row of perforations, as at $c\ c$, figs. 1 and 2, may be of any other shape, provided they are sufficiently capacious, according to the size of the lamp, to permit the equalization of the necessary supply of oxygen to pass up to the wick; and these observations apply to the perforation in the gallery $p$, as best seen in section at fig. 2, and in plan at figs. 5 and 6.

We claim herein as our invention—

The row or series of perforations $c\ c$, formed in the bell-shaped base part G, between the upper and lower perforated plates $f$ and $k$, in combination with said plates, and with the burner-dome E, above the upper plate $f$, substantially as and for the purpose herein set forth.

DAVID PITCAIRN WRIGHT. [L. S.]
 CEPHAS BUTLER. [L. S.]

Witnesses to the signature of D. P. WRIGHT:
 WM. ROBT. LAKE,
 H. I. GEDGE.

Witnesses to the signature of C. BUTLER:
 GEORGE HEATH,
 JOHN BUTLER.